(12) United States Patent
McCloskey et al.

(10) Patent No.: US 8,543,913 B2
(45) Date of Patent: Sep. 24, 2013

(54) IDENTIFYING AND USING TEXTUAL WIDGETS

(75) Inventors: Daniel J. McCloskey, Dublin (IE); Alena Kucharenka, Dublin (IE); Pavel Volkov, Dublin (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 12/252,418

(22) Filed: Oct. 16, 2008

(65) Prior Publication Data

US 2010/0100816 A1 Apr. 22, 2010

(51) Int. Cl.
*G06F 17/00* (2006.01)
(52) U.S. Cl.
USPC .......................................... 715/257; 715/256
(58) Field of Classification Search
USPC .................................. 715/257, 256
See application file for complete search history.

(56) References Cited

U.S. PATENT DOCUMENTS

| | | | | |
|---|---|---|---|---|
| 5,604,897 A | * | 2/1997 | Travis ............................. | 715/257 |
| 6,085,206 A | * | 7/2000 | Domini et al. ................. | 715/257 |
| 2002/0119429 A1 | * | 8/2002 | Barton ........................... | 434/178 |
| 2002/0126097 A1 | * | 9/2002 | Savolainen .................... | 345/168 |
| 2003/0097318 A1 | * | 5/2003 | Yu et al. ............................ | 705/35 |
| 2004/0250208 A1 | * | 12/2004 | Nelms et al. .................. | 715/533 |
| 2005/0262442 A1 | * | 11/2005 | Soin et al. ...................... | 715/533 |
| 2007/0016625 A1 | * | 1/2007 | Berstis ........................... | 707/200 |
| 2007/0240045 A1 | * | 10/2007 | Fux et al. ....................... | 715/533 |
| 2007/0276653 A1 | * | 11/2007 | Greenwald et al. ............. | 704/10 |
| 2008/0168341 A1 | * | 7/2008 | Payette .......................... | 715/212 |
| 2008/0182599 A1 | * | 7/2008 | Rainisto et al. ............... | 455/466 |
| 2008/0244389 A1 | * | 10/2008 | Fux et al. ....................... | 715/257 |

* cited by examiner

*Primary Examiner* — Doug Hutton, Jr.
*Assistant Examiner* — Andrew McIntosh
(74) *Attorney, Agent, or Firm* — Jeff Tang; Hoffman Warnick LLC

(57) ABSTRACT

The disclosure is directed to a method and system for accessing textual widgets. A method in accordance with an embodiment includes: entering a string expression into a document; invoking a spell-checker to check a spelling of the string expression; marking the string expression as misspelled; identifying a textual widget based on the misspelling of the string expression; evaluating the misspelled string expression using the identified textual widget, the identified textual widget returning at least one result of the evaluation; displaying the at least one result of the evaluation; selecting a result of the evaluation; and replacing the string expression in the document with the selected result of the evaluation.

12 Claims, 4 Drawing Sheets

US 8,543,913 B2

IDENTIFYING AND USING TEXTUAL WIDGETS

FIELD OF THE INVENTION

The present invention relates to a method and system for accessing textual widgets.

BACKGROUND OF THE INVENTION

A widget is a small application (software component) that runs in the context of (i.e., is hosted by) another program. Since widgets are generally hosted by dedicated widget engines, it is often difficult to integrate widgets into other programs.

SUMMARY OF THE INVENTION

An embodiment of the present invention is directed to a method for accessing textual widgets, comprising: entering a string expression into a document; invoking a spell-checker to check a spelling of the string expression; marking the string expression as misspelled; identifying a textual widget based on the misspelling of the string expression; evaluating the misspelled string expression using the identified textual widget, the identified textual widget returning at least one result of the evaluation; displaying the at least one result of the evaluation; selecting a result of the evaluation; and replacing the string expression in the document with the selected result of the evaluation.

Another embodiment of the present invention is directed to a system for accessing textual widgets, comprising: a system for entering a string expression into a document; a system for invoking a spell-checker to check a spelling of the string expression; a system for marking the string expression as misspelled; a system for identifying a textual widget based on the misspelling of the string expression; a system for evaluating the misspelled string expression using the identified textual widget, the identified textual widget returning at least one result of the evaluation; a system for displaying the at least one result of the evaluation; a system for selecting a result of the evaluation; and a system for replacing the string expression in the document with the selected result of the evaluation.

Another embodiment of the present invention is directed to a computer program product stored on a computer readable medium, which when executed, provides access to textual widgets, the computer readable medium comprising program code for: entering a string expression into a document; invoking a spell-checker to check a spelling of the string expression; marking the string expression as misspelled; identifying a textual widget based on the misspelling of the string expression; evaluating the misspelled string expression using the identified textual widget, the identified textual widget returning at least one result of the evaluation; displaying the at least one result of the evaluation; selecting a result of the evaluation; and replacing the string expression in the document with the selected result of the evaluation.

Another embodiment of the present invention is directed to a method for deploying an application for accessing textual widgets, comprising: providing a computer infrastructure being operable to: enter a string expression into a document; invoke a spell-checker to check a spelling of the string expression; mark the string expression as misspelled; identify a textual widget based on the misspelling of the string expression; evaluate the misspelled string expression using the identified textual widget, the identified textual widget returning at least one result of the evaluation; display the at least one result of the evaluation; select a result of the evaluation; and replace the string expression in the document with the selected result of the evaluation.

BRIEF DESCRIPTION OF THE DRAWINGS

These and other features will be more readily understood from the following detailed description of the various aspects of the invention taken in conjunction with the accompanying drawings.

DETAILED DESCRIPTION OF THE INVENTION

As stated above, a widget is a small application (software component) that runs in the context of (i.e., is hosted by) another program. The present invention introduces a "textual widget," which comprises a command-line like interface model, and which can be hosted by an application that has text inputting functionality, such as a text editor or a text box in general. One common example of such an application is a spell-checker.

An embodiment of the present invention uses standard spell-checking user interface (UI) controls and standard interface and data flow to handle a request of a non-spellchecking nature. In general, any text box with spell-checking controls (spell-checking is a ubiquitous feature available almost everywhere there is text input) can be configured to host a textual widget, thereby providing extra in-line functionality to a computer user. Advantageously, a textual widget hosted by a spell-checker engine and accessible via spell-check controls is available to text editors with no integration effort, and provides computer users with access to extra functionality within a text editor.

Figure 1:
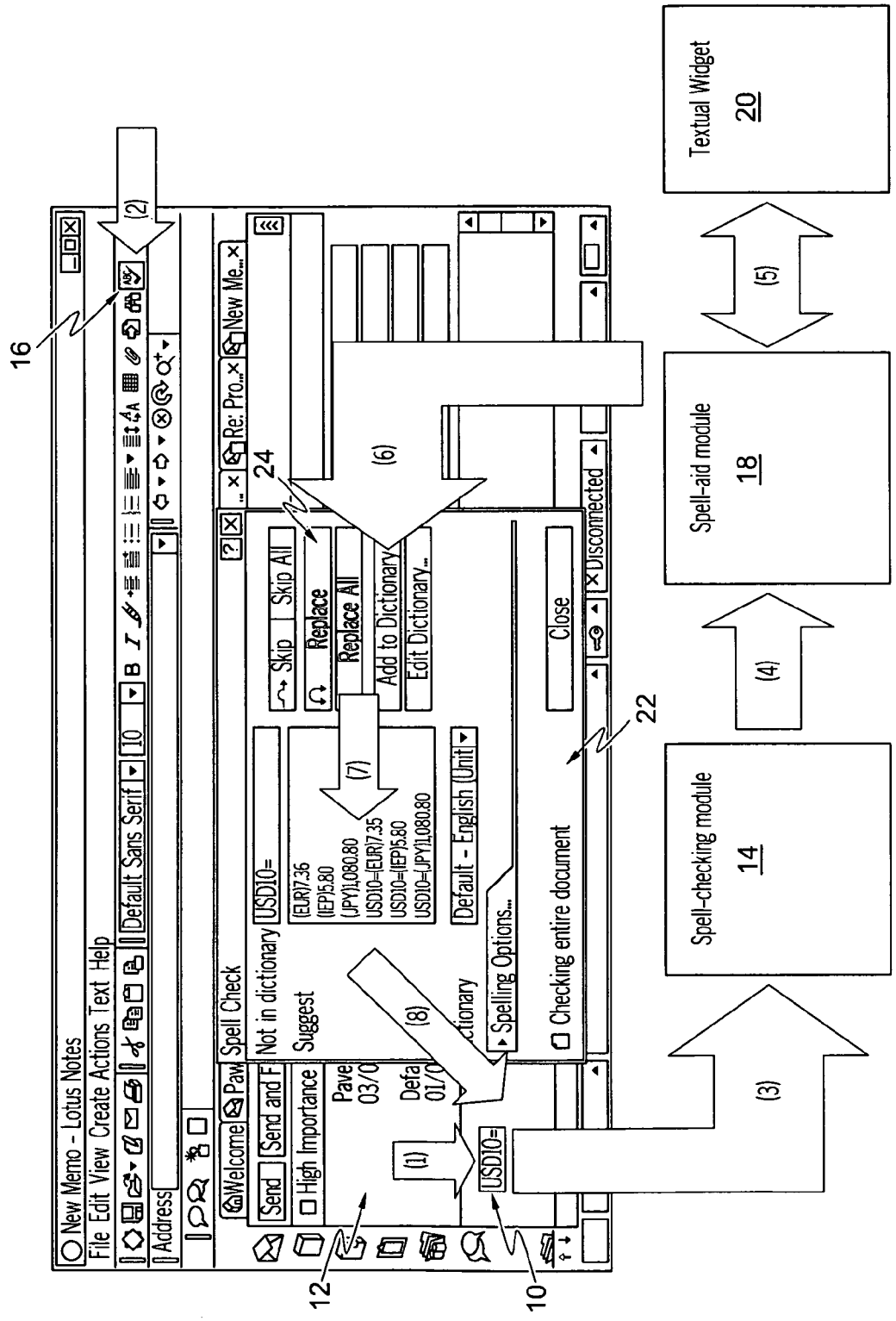
FIG. 1 depicts a flow diagram of an illustrative process for accessing textual widgets in accordance with an embodiment of the present invention.

FIG. 1 depicts a flow diagram of an illustrative process for accessing textual widgets in accordance with an embodiment of the present invention. At process 1, a user types a string expression 10 to be evaluated into a document 12 (e.g., in an email). In this example, the string expression 10 comprises a currency name and value for conversion ("USD10="). At process 2, the user invokes a spell-checking module 14 using a spell-check control button 16, hot key, etc, and the string expression 10 is passed to the spell-checking module 14 for evaluation at process 3. Alternatively, the spell-checking can run automatically (e.g., check as you type). The spell-checking module 14 marks the string expression 10 as misspelled. This can be done by highlighting or underlining the string expression 10 or in any other suitable manner.

At process 4, the string expression 10 marked as misspelled is passed to a spell-aid module 18 and evaluated at process 5 by an appropriate plug-in module comprising a textual widget 20. A plurality of different textual widgets 20, each providing a particular function, can be provided. At process 6, results of the evaluation of the string expression 10 by the textual widget 20 are passed to a spelling suggestion dialog window 22 of the spell-checking module 14 and are displayed to the user at process 7. The displaying of the results can be optional. The results can include, for example, a status code to indicate success of some other operation such as for example, linking the current sentence, word, paragraph or entire document to a point in an index file on a remote server). In the displayed example, evaluation of the string expression "USD10=" provides the following results:

"(EUR)7.36";
"(IEP)5.80";
"(JPY)1,080.80";
"USD10=(EUR)7.36";
"USD10=(IEP)5.80"; and
"USD10=(JPY)1,080.80."

At process 8, selection of one of the displayed results by the user and actuation of the Replace button 24 causes that result to be displayed in place of the string expression 10 in the document 12. In some cases, selection of a result and/or replacement with a result may not be required.

Formulas are typically marked as misspellings by default in most spell-checkers. A user can also use string expressions 10 comprising predefined prefixes or suffixes for certain queries. These prefixes/suffixes force the misspelling of the string expression 10 and specify the identity of the textual widget 20 to be used and the type of action/evaluation to be performed based on the string expression 10. This invention allows for open extendable expression syntax, and can be leveraged by any application supporting spell-checking (e.g., word processing editors, text file editors, presentation developers, project tooling, spreadsheets, IM chat, etc.).

Examples of string expressions 10 and their corresponding textual widgets 20 are as follows:

string expression 1 invokes textual widget 1;
string expression 2 invokes textual widget 2;
string expression 3 invokes textual widget 3;
string expression with prefix 1 invokes textual widget A;
string expression with prefix 2 invokes textual widget B;
string expression with suffix 1 invokes textual widget X; and
string expression with suffix 2 invokes textual widget Y.

If a string expression 10 is not associated with a textual widget, the spell checker operates in a normal manner, returning spelling suggestions for the string expression 10.

Each textual widget 20 is configured to perform a particular function/operation. This may include, for example, obtaining information from a local or remote source (e.g., over the Internet), performing a calculation or conversion, sending, a URL or document ID to a server based index, and/or the like.

Illustrative scenarios involving the present invention are presented below.

Scenario 1

A user is drafting an email to report a problem with their system, and has recorded the name of a dynamic link library (dll) which is causing the problem. The user would like to include version information for this library in the email. Typically, the user would have to leave the context of their email text processor, find the file on the operating system, obtain the version information, and then transcribe the version information into the email. Using the present invention, however, the user simply types the name of the dll followed by the suffix "xyxverinfo" (e.g., "mysql.dllxyxverinfo") into the email and invokes the spell-checker associated with the email text processor. The spell-checker then identifies the string expression "mysql.dllxyxverinfo" as a misspelling. A textual widget associated with the suffix "xyxverinfo" evaluates the dll file "mysql.dll" for its version information and displays the version information in the spelling suggestion dialog window of the spell-checker. Upon clicking the Replace button 24 of the spell checker, the version information is placed into the text of the email.

Scenario 2

A user is writing an email to her manager reporting on the performance of various competitors, and needs to insert the current stock prices (or other financial information) of the companies in question. In accordance with the present invention, the user types the name of a company (e.g., Company A) into the email using the prefix "zyzstockprice" (e.g., "zyzstockpriceCompanyA"), and invokes the spell-checker associated with the email text processor. The spell-checker then identifies the string expression "zyzstockpriceMcDonalds" as a misspelling. A textual widget associated with the prefix "zyzstockprice" obtains the current stock price for Company A and displays the current stock price in the spelling suggestion dialog window of the spell-checker. Upon clicking the Replace button 24 of the spell checker, the current stock price for Company A is placed into the text of the email.

Figure 2:
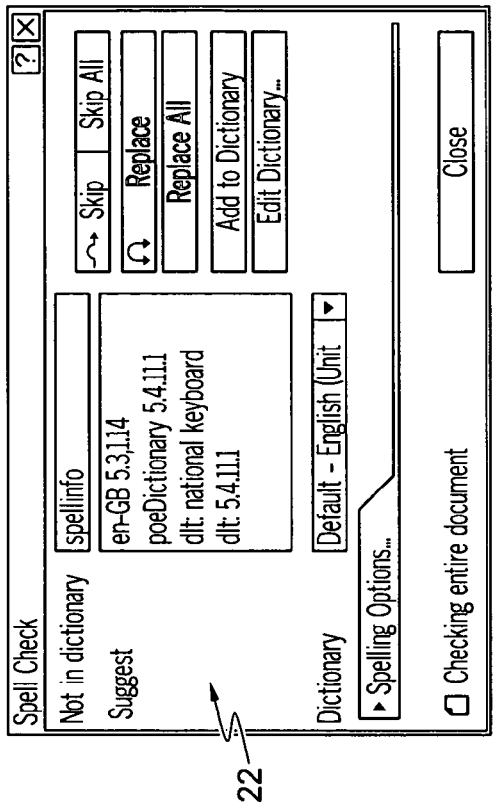
FIG. 2 depicts an embodiment for providing versioning information in accordance with an embodiment of the present invention.

Referring now to FIG. 2, there is shown the spelling suggestion dialog window 22 of a spell-checker in the case where a user has typed the string expression "spellinfo" into a document in order to obtain information regarding the spelling dictionaries associated with the spell checker. The string expression "spellinfo" has been identified as a misspelling by the spell checker. The textual widget associated with the string expression "spellinfo" provides information regarding the spelling dictionaries associated with the spell checker, and this information is displayed in the spelling suggestion dialog window 22.

Figure 3:
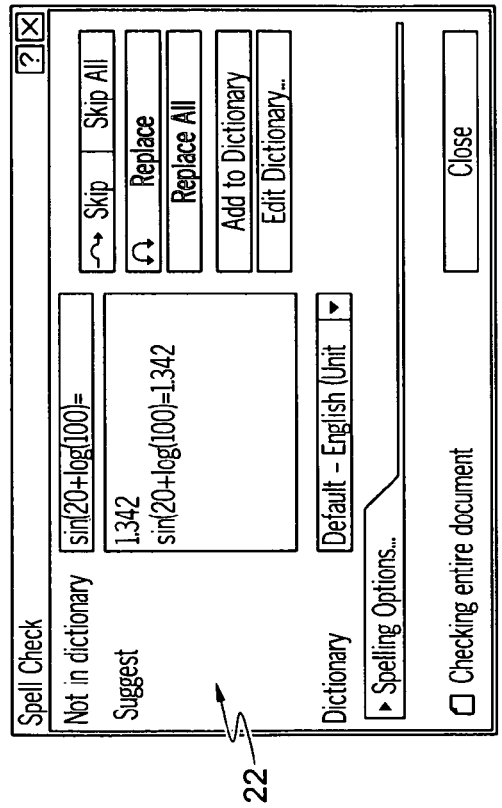
FIG. 3 an embodiment for providing calculator functions in accordance with an embodiment of the present invention.
Figure 4:
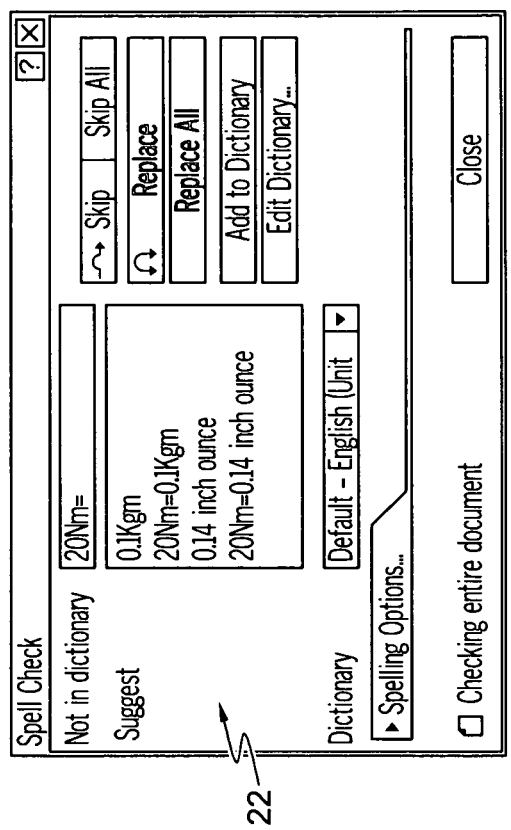
FIG. 4 an embodiment for providing unit and currency conversion in accordance with an embodiment of the present invention.

Another example of the present invention is displayed in FIG. 3. In this case, a textual widget operating as a calculator evaluates the textual string "sin(20)+log(100)=" and returns at least one result of the calculation, which is displayed in the spelling suggestion dialog window 22. A further example of the present invention is displayed in FIG. 4. In this case, a textual widget operating as a unit converter evaluates the textual string "20Nm=" and returns at least one result of the calculation, which is displayed in the spelling suggestion dialog window 22.

Figure 5:
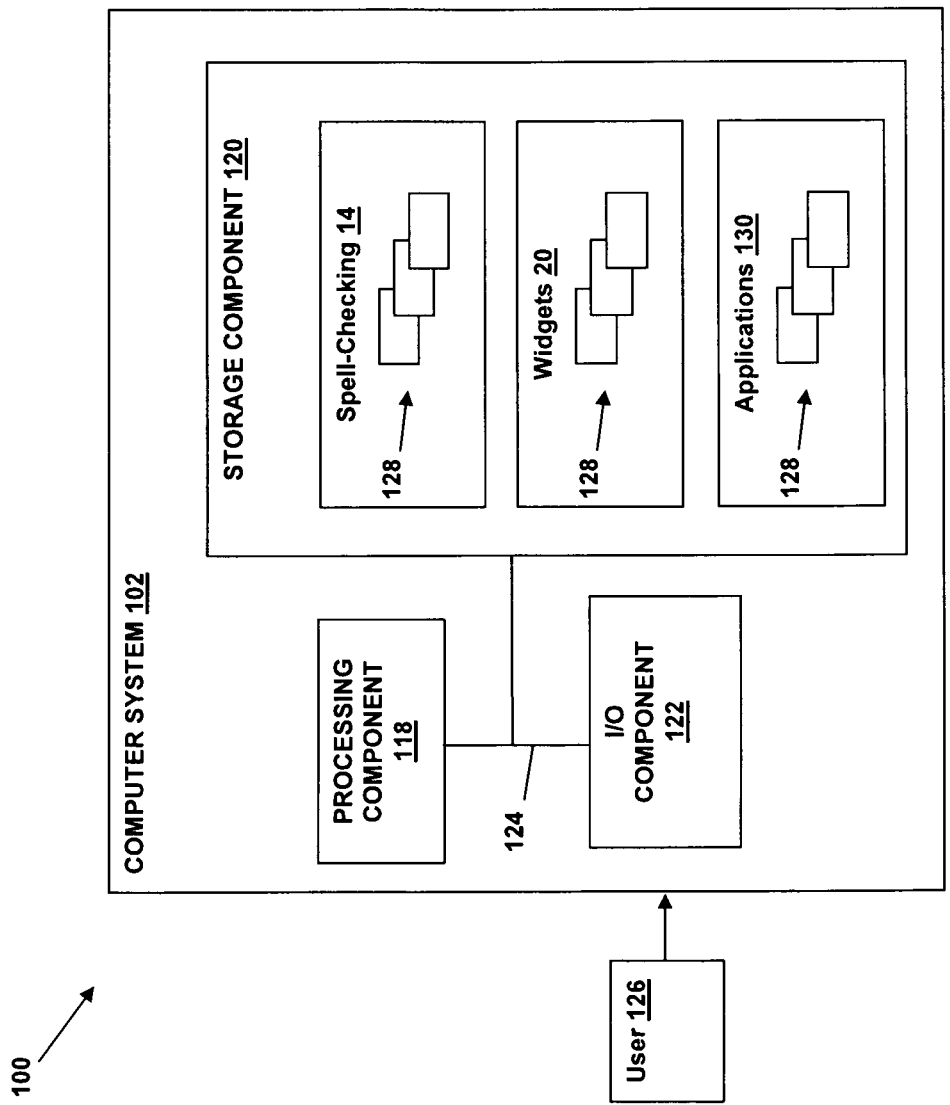
FIG. 5 depicts an illustrative environment for implementing the present invention.

FIG. 5 shows an illustrative environment 100 for accessing textual widgets in accordance with any/all embodiments of the disclosure. To this extent, environment 100 includes a computer system 102 that can perform the processes described herein.

The computer system 102 is shown including a processing component 118 (e.g., one or more processors), a storage component 120 (e.g., a storage hierarchy), an input/output (I/O) component 122 (e.g., one or more I/O interfaces and/or devices), and a communications pathway 124. In general, the processing component 118 executes program code, such as spell-checking module 14, textual widget(s) 20, and application(s) 130 (e.g., email, word processor, etc.) that support spell-checking, which are at least partially stored in storage component 120. While executing program code, the processing component 118 can read and/or write data to/from the storage component 120 and/or the I/O component 122. The communication pathway 124 provides a communications link between each of the components in computer system 102. The I/O component 122 can comprise one or more human I/O devices, which enable a human user 126 to interact with the computer system 102, and/or one or more communications devices to enable other computer system(s) to communicate with the computer system 102 using any type of communications link.

The computer system 102 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, spell-checking module 14, textual widget(s) 20, and application(s) 130 can be embodied as any combination of system software and/or application software. Further, spell-checking module 14, textual widget(s) 20, and/or application(s) 130 can each be implemented using a set of modules 128. In this case, a module 128 can comprise a component that performs a set of actions used by the spell-checking module 14, textual widget(s) 20, and/or application(s) 130. Further, it is understood that some of the actions discussed herein may not be implemented or additional actions may be implemented by computer system 102.

When the computer system 102 comprises multiple computing devices, each computing device can have only a portion of the spell-checking module 14, textual widget(s) 20, and/or application(s) 130 installed thereon (e.g., one or more modules 128). However, it is understood that the computer system 102 is only representative of various possible equivalent computer systems that may implement the process described herein. To this extent, in other embodiments, the actions implemented by the computer system 102 can be at least partially implemented by one or more computing devices that include any combination of general and/or specific purpose hardware and/or program code. In each embodiment, the program code and hardware can be provided using standard programming and engineering techniques, respectively.

When the computer system 102 includes multiple computing devices, the computing devices can communicate over any type of communications link. Further, while performing the process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

It is understood that each of the process flows shown and described herein are only illustrative. To this extent, numerous variations of these process flows are possible, and are included within the scope of this disclosure. Illustrative variations include performing one or more processes in parallel and/or a different order, performing additional processes, not performing some processes, and/or the like. To this extent, multiple tasks/threads/processes can be used to perform the actions of the processes described herein.

It is further understood that aspects of the invention further provide various alternative embodiments. For example, in one embodiment, the invention provides a computer program stored on at least one computer-readable medium, which when executed, enables a computer system to perform the processes described above. To this extent, the computer-readable medium can include program code for implementing some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, a computer system, such as the computer system 102, can be obtained (e.g., provided, created, maintained, made available, etc.) and one or more programs/systems for performing the process described herein can be obtained (e.g., provided, created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

Aspects of the invention can be also implemented as part of a business method that performs the process described herein on a subscription, advertising, and/or fee basis. That is, a service provider could offer to provide some/all of the components/processes needed to provide status-based filtered email alerts, as described herein. In this case, the service provider can manage (e.g., create, maintain, support, etc.) some or all of the environment 100, such as the computer system 102, that performs the process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for accessing textual widgets, comprising:
   invoking a spell-checker to check a spelling of a string expression, wherein the string expression includes one of a predefined prefix, a predefined suffix or a predefined formula;
   marking the string expression as misspelled based upon the predefined prefix, the predefined suffix or the predefined formula;

executing one of a plurality of textual widgets for performing a non-spellchecking function, wherein the executed textual widget is associated with the string expression via the predefined prefix, the predefined suffix or the predefined formula, and wherein each different textual widget performs a different function/operation upon the marked string expression;

returning at least one result of the non-spellchecking function; and displaying the at least one result.

2. The method of claim 1, wherein displaying the at least one result further comprises:

displaying the at least one result in a spelling suggestion-dialog window of the spell-checker.

3. A system for accessing textual widgets, comprising:

at least one computer hardware device for performing a method, the method comprising:

invoking a spell-checker to check a spelling of a string expression, wherein the string expression includes one of a predefined prefix, a predefined suffix or a predefined formula;

marking the string expression as misspelled based upon the predefined prefix, the predefined suffix or the predefined formula;

executing one of a plurality of textual widgets for performing a non-spellchecking function, wherein the executed textual widget is associated with the string expression via the predefined prefix, the predefined suffix or the predefined formula, and wherein each different textual widget performs a different function/operation upon the marked string expression;

returning at least one result of the non-spellchecking function; and displaying the at least one result.

4. The system of claim 3, wherein the displaying the at least one result further comprises:

displaying the at least one result of the evaluation in a spelling suggestion dialog window of the spell-checker.

5. A computer program product stored on a non-transitory computer readable medium, which when executed, accesses textual widgets, the computer readable medium comprising program code for:

invoking a spell-checker to check a spelling of a string expression, wherein the string expression includes one of a predefined prefix, a predefined suffix or a predefined formula;

marking the string expression as misspelled based upon the predefined prefix, the predefined suffix or the predefined formula;

executing one of a plurality of textual widgets for performing a non-spellchecking function, wherein the executed textual widget is associated with the string expression via the predefined prefix, the predefined suffix or the predefined formula, and wherein each different textual widget performs a different function/operation upon the marked string expression;

returning at least one result of the non-spellchecking function; and displaying the at least one result.

6. A method for deploying an application for accessing textual widgets, comprising:

providing a computer infrastructure being operable to:

invoke a spell-checker to check a spelling of a string expression, wherein the string expression includes one of a predefined prefix, a predefined suffix or a predefined formula;

mark the string expression as misspelled based upon the predefined prefix, the predefined suffix or the predefined formula;

execute one of a plurality of textual widgets for performing a non-spellchecking function, wherein the executed textual widget is associated with the string expression via the predefined prefix, the predefined suffix or the predefined formula, and wherein each different textual widget performs a different function/operation upon the marked string expression;

returning at least one result of the non-spellchecking function; and displaying the at least one result.

7. The computer program product of claim 5, wherein displaying the at least one result further comprises:

displaying the at least one result in a spelling suggestion dialog window of the spell-checker.

8. The method for deploying of claim 6, wherein displaying the at least one result further comprises:

displaying the at least one result in a spelling suggestion dialog window of the spell-checker.

9. The method of claim 1, further comprising: selecting a result; and replacing the string expression in the document with the selected result.

10. The system of claim 3, further comprising:

a system for selecting a result; and a system for replacing the string expression in the document with the selected result.

11. The computer program product of claim 5, further comprising program code for:

selecting a result; and replacing the string expression in the document with the selected result.

12. The method of claim 6, further comprising:

select a result; and replace the string expression in the document with the selected result.

* * * * *